(12) United States Patent
Rock et al.

(10) Patent No.: US 10,414,626 B2
(45) Date of Patent: Sep. 17, 2019

(54) REEL TRANSPORT APPARATUS AND METHOD

(71) Applicant: SCHLUMBERGER TECHNOLOGY CORPORATION, Sugar Land, TX (US)

(72) Inventors: Devin Rock, Fulshear, TX (US); Pedro Rangel, Richmond, TX (US); Eddie R. Burrell, Anchorage, AK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 329 days.

(21) Appl. No.: 15/122,233

(22) PCT Filed: Feb. 27, 2015

(86) PCT No.: PCT/US2015/018094
§ 371 (c)(1),
(2) Date: Aug. 29, 2016

(87) PCT Pub. No.: WO2015/131096
PCT Pub. Date: Sep. 3, 2015

(65) Prior Publication Data
US 2016/0362275 A1 Dec. 15, 2016

Related U.S. Application Data

(60) Provisional application No. 61/945,678, filed on Feb. 27, 2014.

(51) Int. Cl.
*B65H 75/42* (2006.01)
*B60P 3/035* (2006.01)
(Continued)

(52) U.S. Cl.
CPC .............. *B65H 75/425* (2013.01); *B60P 1/02* (2013.01); *B60P 3/035* (2013.01);
(Continued)

(58) Field of Classification Search
CPC .............. B65H 75/425; B65H 75/4481; B65H 75/4471; B65H 2701/33; B60P 1/02; B60P 3/035; B60S 9/02
See application file for complete search history.

(56) References Cited

U.S. PATENT DOCUMENTS 3,841,407 A   10/1974   Bozeman
3,860,193 A * 1/1975   Green ..................... B60P 3/035
                                                            242/557

(Continued)

FOREIGN PATENT DOCUMENTS

GB        2367280 A  *  4/2002   .............. B60P 3/035
WO   WO-2017147656 A1 *  9/2017   .............. B65H 49/32

OTHER PUBLICATIONS

International Search Report and Written Opinion issued in International Patent Application No. PCT/US2015/018094 dated Jun. 4, 2015; 16 pages.

*Primary Examiner* — William E Dondero

(57) ABSTRACT

An apparatus comprising a mobile carrier operable for transporting a reel of oilfield tubing across ground. The mobile carrier comprises a frame comprising a first frame portion, a second frame portion, and a central frame portion extending between the first and second frame portions. The first, second, and central frame portions define an opening for receiving the reel. The mobile carrier also comprises a locking mechanism operable to engage and rotate the reel within the opening, and a plurality of wheels supporting the frame on the ground. The plurality of wheels comprises a plurality of first wheels operably connected to the first frame portion and a plurality of second wheels operably connected to the second frame portion. The opening interposes the plurality of first wheels and the plurality of second wheels.

6 Claims, 10 Drawing Sheets

(51) Int. Cl.
*B60P 1/02* (2006.01)
*B65H 75/44* (2006.01)
*B60S 9/02* (2006.01)

(52) U.S. Cl.
CPC ..... *B65H 75/4471* (2013.01); *B65H 75/4481* (2013.01); *B60S 9/02* (2013.01); *B65H 2701/33* (2013.01)

(56) References Cited

U.S. PATENT DOCUMENTS

| | | |
|---|---|---|
| 3,931,902 A | 1/1976 | Love, Jr. |
| 4,445,643 A | 5/1984 | Thorsby et al. |
| 4,945,938 A | 8/1990 | Ponsford et al. |
| 6,494,397 B1 | 12/2002 | Myklebust |
| 7,954,554 B2 | 6/2011 | Shampine et al. |
| 2004/0251374 A1 | 12/2004 | French |
| 2008/0088146 A1 | 4/2008 | Newman |
| 2009/0218106 A1 | 9/2009 | Stukey et al. |

* cited by examiner

REEL TRANSPORT APPARATUS AND METHOD

CROSS-REFERENCE TO RELATED APPLICATIONS

This application is a 35 U.S.C. § 371 National Phase of International Patent Application No. PCT/US2015/018094 filed Feb. 27, 2015, which claims priority and the benefit of U.S. Provisional Application No. 61/945,678, entitled "COILED TUBING REEL MODULE," filed on Feb. 27, 2014, the entire disclosures of each of which are hereby incorporated herein by reference.

BACKGROUND OF THE DISCLOSURE

Coiled tubing has been utilized for performing well treatment and/or well intervention operations including, but not limited to, hydraulic fracturing, matrix acidizing, milling, perforating, and coiled tubing drilling, among other examples. Coiled tubing apparatus may include surface pumping facilities, a reel of coiled tubing, a means for conveying the coiled tubing into and out of the wellbore (e.g., an injector head), and a surface control apparatus at the wellhead.

Coiled tubing is wound upon the reel for spooling and unspooling when performing an operation in the wellbore. The reel of coiled tubing is transported to the wellsite via a tractor-trailer and/or other transport vehicle. Cranes, forklifts, and/or other lifting devices, which are independent from the transport vehicle, are utilized to load and unload the reel of coiled tubing onto and from the transport vehicle. Thus, in addition to the reel of coiled tubing, the lifting devices are also transported to the wellsite. Moreover, when overhead cranes are utilized, the reel of coiled tubing is exposed to wind loads, increasing difficulty of the loading and/or unloading operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a mobile carrier operable for transporting a reel of oilfield tubing across ground. The mobile carrier includes a frame that includes a first frame portion, a second frame portion, and a central frame portion extending between the first and second frame portions. The first, second, and central frame portions define an opening for receiving the reel. The mobile carrier also includes a locking mechanism operable to engage and rotate the reel within the opening, and wheels supporting the frame on the ground. The wheels include first wheels, operably connected to the first frame portion, and second wheels, operably connected to the second frame portion. The opening interposes the first wheels and the second wheels.

The present disclosure also introduces a method that includes moving a mobile carrier over ground toward a reel containing oilfield tubing. The mobile carrier includes a frame defining an opening for receiving the reel, a locking mechanism connected to the frame and operable to engage and rotate the reel within the opening, and wheels connected to and supporting the frame on the ground. The wheels include first wheels and second wheels, and the opening interposes the first wheels and the second wheels. The mobile carrier is then moved relative to the reel until the reel is located within the opening and proximate the locking mechanism, such that the reel interposes the first wheels and the second wheels. The reel is then engaged with the locking mechanism.

The present disclosure also introduces an apparatus that includes a frame defining an opening for receiving a reel of oilfield tubing, a locking mechanism operable to engage and rotate the reel within the opening, and wheels supporting the frame on the ground. The wheels include first wheels and second wheels operably connected to the frame. The opening interposes the first wheels and the second wheels.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
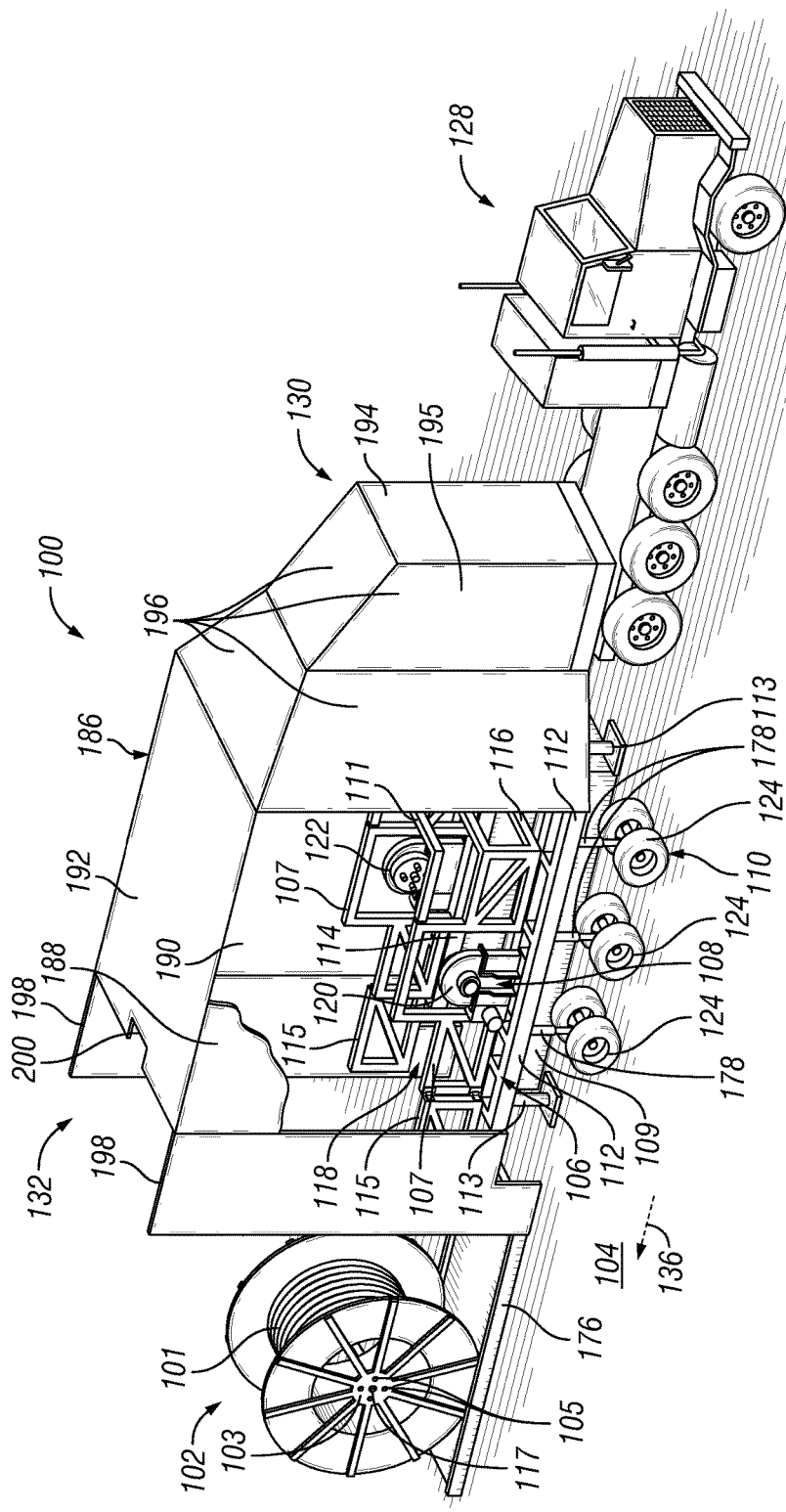
FIG. 1 is a perspective view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a perspective view of at least a portion of a mobile carrier 100 according to one or more aspects of the present disclosure. The mobile carrier 100 may be operable for loading thereon and/or transporting a reel 102 of oilfield tubing 101, such as coiled tubing, along the ground 104. In an embodiment, the oilfield tubing 101 comprises an oilfield spooled conveyance such as wireline cable, a slickline cable, or the like. The mobile carrier 100 may comprise a frame 106, a locking mechanism 108 operatively connected with the frame 106, and a plurality of wheels 110 operatively connected with the frame 106 for supporting the frame 106 on the ground 104. The mobile carrier 100 may be further operable for connection or integration with a prime mover 128 operable to pull or otherwise move the mobile carrier 100 along the ground 104.

The mobile carrier 100 and the prime mover 128, whether integrated as a single automotive vehicle or as two discrete apparatus connected together, may comply with various state, federal, and international regulations for transport over public roadways. In this regard, the mobile carrier 100 and the prime mover 128 may each or collectively have a width equal to or less than about 12 feet (or about 3.7 meters), a height equal to or less than about 13.5 feet (or about 4.1 meters), and a length equal to or less than about 53 feet (or about 16.2 meters).

Figure 2:
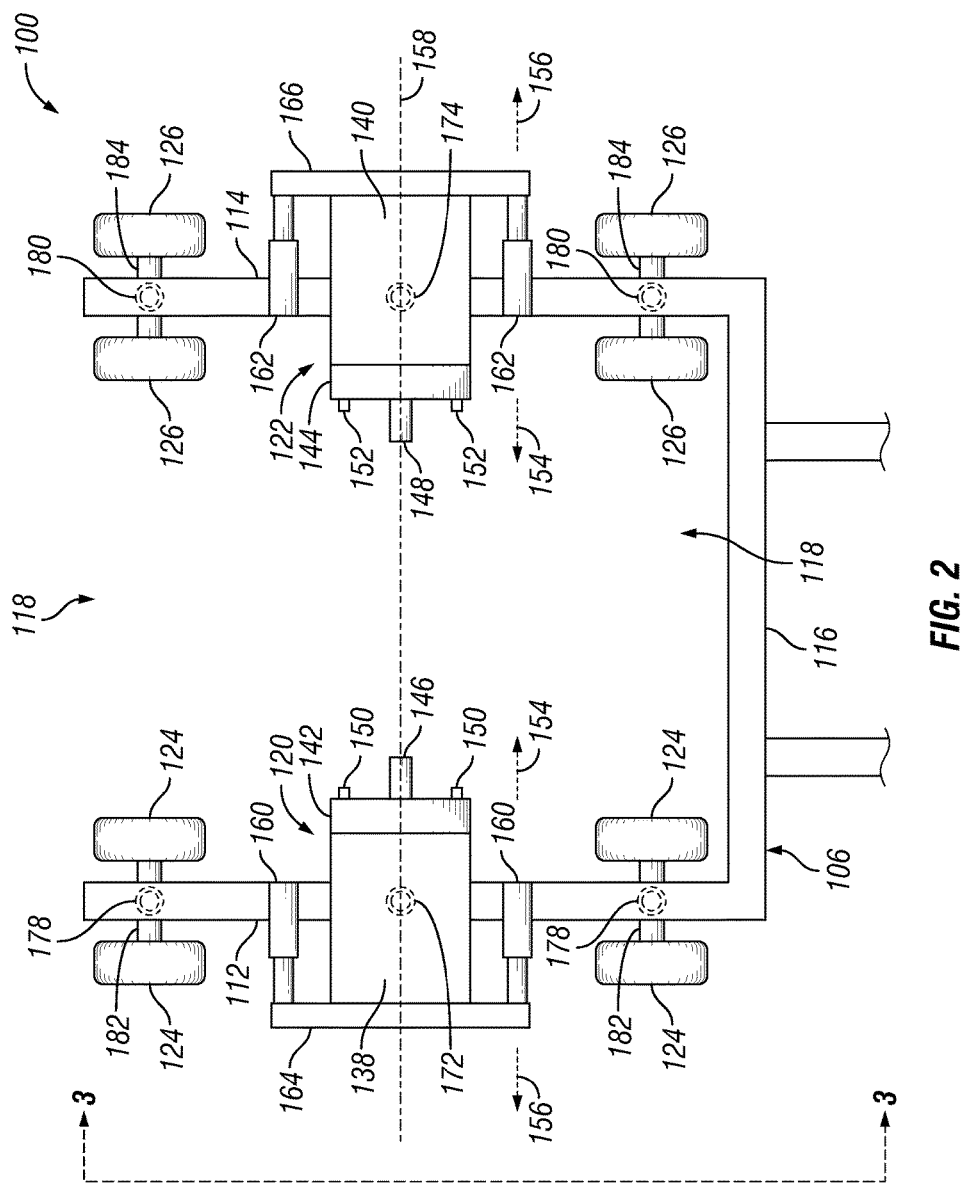
FIG. 2 is a top schematic view of a portion of an example implementation of the apparatus shown in FIG. 1 according to one or more aspects of the present disclosure.
Figure 3:
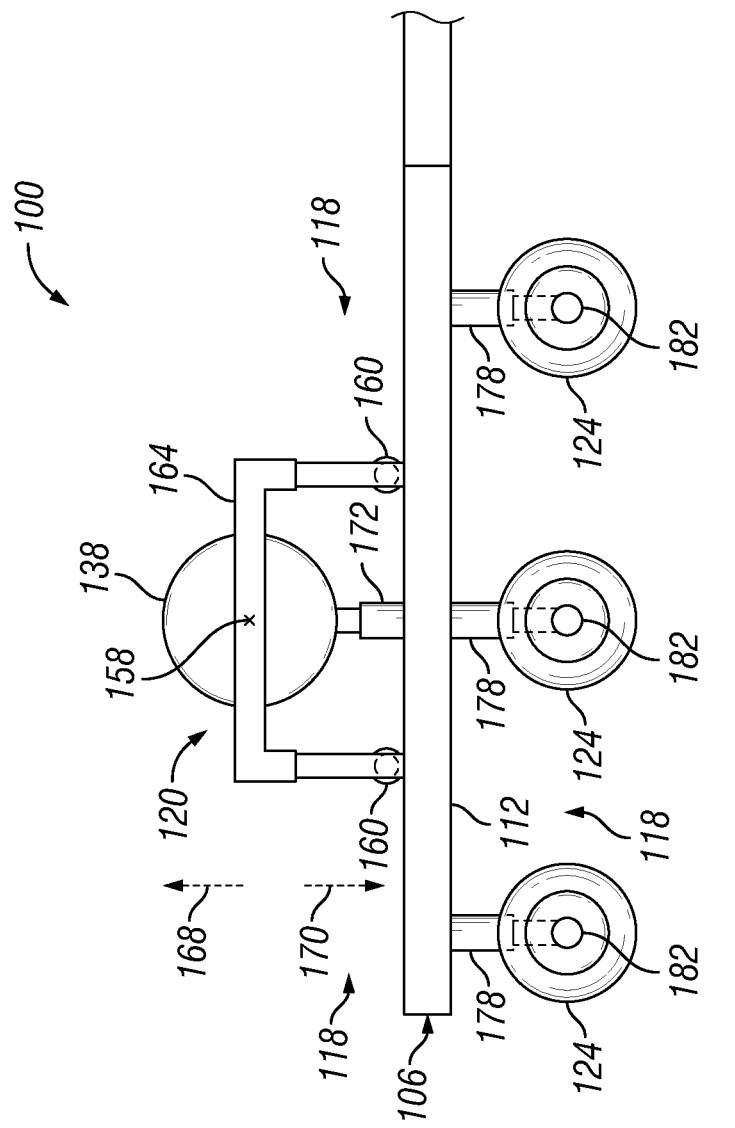
FIG. 3 is a side schematic view of the apparatus shown in FIG. 2 according to one or more aspects of the present disclosure.

FIG. 2 is a top schematic view of a portion of an example implementation of the mobile carrier 100 according to one or more aspects of the present disclosure. FIG. 3 is a side schematic view of the portion of the mobile carrier 100 shown in FIG. 2 according to one or more aspects of the present disclosure. Referring to FIGS. 1-3, collectively, the frame 106 may have a generally U-shaped configuration comprising a first frame portion 112, a second frame portion 114, and a central frame portion 116 extending between the first and second frame portions 112, 114. The first, second, and central frame portions 112, 114, 116 may define an opening 118, which may be operable for receiving the reel 102 therein. The first and second frame portions 112, 114 may each extend substantially longitudinally relative to the mobile carrier 100, and the central frame portion 116 may extend substantially laterally relative to the mobile carrier 100. The opening 118 may extend between the first and second frame portions 112, 114 and terminate at the central frame portion 116. The opening 118 may further extend above and below the frame 106, such as may permit the reel 102 to extend above and below the frame 106 when received within the opening 118.

The mobile carrier 100 is moveable along the ground 104 to permit the first and second frame portions 112, 114 to be positioned on opposing sides of the reel 102 disposed on the ground 104. That is, the opening 118 may extend vertically to the ground 104 to permit the reel 102 to be received within the opening 118 when the reel 102 rests on the ground 104. Thus, to receive the reel 102, the opening 118 may not include or contain therein substantial projections, connecting members, and/or other features extending between the first and second frame portions 112, 114 that would prevent positioning the opening 118 around the reel 102 when the reel 102 is resting on the ground 104, at least during the process of loading and unloading the reel 102 onto and from the mobile carrier 100.

As further shown in FIGS. 1-3, the locking mechanism 108 may comprise a first locking portion 120 and a second locking portion 122. The first locking portion 120 is connected to or otherwise carried with the first frame portion 112, and the second locking portion 122 is connected to or otherwise carried with the second frame portion 114. The first and second locking portions 120, 122 may be cooperatively operable to engage, hold, and/or rotate the reel 102 within the opening 118.

For example, the locking portions 120, 122 may comprise corresponding rotary actuators 138, 140 coupled with the frame 106. The rotary actuators 138, 140 may be operable for providing rotational motion to the reel 102, such as during wellsite operations. The locking portions 120, 122 may further comprise corresponding flanges or other interfaces (hereafter collectively referred to as flanges) 142, 144 rotatably coupled with the respective rotary actuator 138, 140. The flanges 142, 144 may engage or otherwise contact opposing connection faces 103 of the reel 102. Each flange 142, 144 may be operatively coupled with a rotatable output shaft (not shown) of the corresponding rotary actuator 138, 140, such as may facilitate rotation of each flange 142, 144. The flanges 142, 144 may further comprise corresponding support pins 146, 148 operable to mate with or otherwise engage a corresponding central aperture 117 extending into each connection face 103 of the reel 102. The flanges 142, 144 may also respectively comprise one or more drive pins 150, 152 operable to mate with or otherwise engage a corresponding one or more lateral apertures 105 extending into each connection face 103 of the reel 102. The support pins 146, 148 may be operable to support and/or maintain the reel 102 in a predetermined position with respect to the frame 106, while the drive pins 150, 152 may facilitate torque transfer from the rotary actuators 138, 140 to the reel 102.

The rotary actuators 138, 140 may be implemented in a variety of manners, such as electric motors, hydraulic motors, and/or other suitable rotary actuators operable to rotate the reel 102, as described above. Although the locking mechanism 108 is shown comprising two opposing rotary actuators 138, 140, the locking mechanism 108 may comprise a single rotary actuator as part of one of the first and second locking portions 120, 122, such as may be operable to rotate the reel 102 with respect to the frame 106. The locking mechanism 108 may further comprise other quantities of rotary actuators depending, for example, on the size of the actuators and/or the size and/or weight of the reel 102. For example, each locking portion 120, 122 may comprise two or more rotary actuators cooperatively or otherwise operable to rotate the reel 102 with respect to the frame 106. The rotary actuators 138, 140 may also be omitted in implementations lacking the ability to transfer torque to the reel 102, although the flanges 142, 144 may still be free to rotate, thereby permitting the reel 102 to rotate relative to the frame 106.

Portions of the locking mechanism 108 may be configured to slide or otherwise translate in laterally inward and outward directions, along a horizontal axis 158 extending substantially perpendicular with respect to the first and second frame portions 112, 114, as indicated in FIG. 2 by arrows 154, 156. For example, the first and second locking portions 120, 122 may comprise a plurality of linear actuators 160, 162, which may be operable to move the rotary actuators 138, 140 and/or the flanges 142, 144 in the inward and outward directions 154, 156 along the horizontal axis 158. The linear actuators 160, 162 may be coupled directly with the frame 106 and indirectly with the rotary actuators 138, 140 via brackets 164, 166. Accordingly, during reel locking operations, the actuators 160, 162 may be operable to translate the rotary actuators 138, 140 and/or the flanges 142, 144 in the inward direction 154 to engage the reel 102 at its opposing connection faces 103. Likewise, during reel unlocking operations, the actuators 160, 162 may be operable to translate the rotary actuators 138, 140 and/or the flanges 142, 144 in the outward direction 156 to disengage from the opposing connection faces 103. The locking mechanism 108 may also or instead comprise a horizontal support system (not shown), such as a rail system, a roller system, and/or other means for supporting and/or stabilizing the rotary actuators 138, 140 and/or the flanges 142, 144 as they move along the horizontal axis 158 with respect to the frame 106.

Portion of the locking mechanism 108 may be further operable to cooperatively move in upward and downward directions, relative to the frame 106 and/or the ground 104, as indicated in FIG. 3 by arrows 168, 170. For example, the first and second locking portions 120, 122 may further comprise a plurality of linear actuators 172, 174 operable to translate the rotary actuators 138, 140 and/or the flanges 142, 144 in the upward and downward directions 168, 170. The linear actuators 172, 174 may be coupled directly to the frame 106 and the rotary actuators 138, 140 and/or the flanges 142, 144, or the linear actuators 172, 174 may be coupled indirectly to the frame 106 and the rotary actuators 138, 140 and/or the flanges 142, 144 via brackets (not shown). Accordingly, prior to engagement of the first and second locking portions 120, 122 with the reel 102, the linear actuators 172, 174 may lift or lower the rotary actuators 138, 140 and/or the flanges 142, 144 with respect to the reel 102 disposed on the ground 104 and/or on a support platform 176, such that the support pins 146, 148, the drive pins 150, 152, and/or other portions of the flanges 142, 144 may engage the corresponding apertures 105, 117 and/or connection faces 103 of the reel 102. After the locking portions 120, 122 couple with the reel 102, the actuators 172, 174 may lift or vertically move the reel 102 off the ground 104 or the support platform 176, such as may permit sufficient clearance between the reel 102 and the ground 104 during transportation. Likewise, the actuators 172, 174 may lower the reel 102 onto the ground 104 or the support platform 176, such as may permit the reel to be unloaded and/or changed. The locking mechanism 108 may also or instead comprise a vertical support system (not shown), such as a rail system, roller system, or other means of facilitating stability and/or lateral support to the rotary actuators 138, 140 and/or the flanges 142, 144 as they move in the upward and downward directions 168, 170 with respect to the frame 106 and/or the ground 104.

Each set of linear actuators 172, 174 and 160, 162 may be implemented in a variety of manners, such as hydraulic cylinders, pneumatic cylinders, screw jacks, electrical actuators, mechanical actuators, and/or other suitable actuators operable to move the rotary actuators 138, 140 and/or the flanges 142, 144 vertically and/or horizontally, as described above. Although the sets of linear actuators 172, 174 and 160, 162 are shown in FIGS. 2 and 3 as comprising two and four actuators, respectfully, other numbers of actuators may also be provided depending, for example, on the size of the actuators and/or the size and/or weight of the reel 102.

As further shown in FIG. 1, the mobile carrier 100 may comprise upper and lower guards 107, 109 connected with the frame 106. The upper and lower guards 107, 109 may comprise one or more plates, beams, and/or other members and extend around at least a portion of the perimeter of the opening 118 above and/or below the frame 106. The upper and lower guards 107, 109 may aid in protecting the locking mechanism 108 and/or the reel 102, when disposed within the opening 118, and/or in protecting human operators during rotation of the reel 102. The upper and lower guards 107, 109 may further provide the frame 106 and/or the locking mechanism 108 with additional support and/or structural integrity to support the reel 102 in connection with the locking mechanism 108 during transport and/or wellsite operations.

The mobile carrier 100 may further comprise a gate 115 connected with the frame 106. The gate 115 may comprise one or more plates, beams, and/or other members pivotally connected with the first and/or second frame portions 112, 114 at a rearward end 132 of the mobile carrier 100, such as may facilitate opening and closing of the opening 118. The gate 115 may be movable between an open position (shown in FIG. 1), such as may be utilized during loading and unloading of the reel 102, and a closed position (shown in FIG. 9), such as may be utilized when the oilfield tubing 101 is being wound and unwound. The gate 115 may also aid in protecting the reel 102 when disposed within the opening 118, and/or in protecting human operators during rotation of the reel 102.

The mobile carrier 100 may further comprise a levelwind assembly 111 operable to guide the oilfield tubing 101 as it is wound and unwound from the reel 102. The levelwind assembly 111 may be movable between a retracted position (shown in FIG. 1), utilized prior to and during loading and unloading of the reel 102, and an extended position (shown in FIG. 9), utilized when the oilfield tubing 101 is being wound and unwound. The levelwind assembly 111 may aid in ensuring that the oilfield tubing 101 is wound evenly onto the reel 102, such as may aid in maximizing the amount of oilfield tubing 101 that can be wound onto the reel 102 and/or minimizing damage to the oilfield tubing 101 that may otherwise be caused if the oilfield tubing 101 were wound unevenly onto the reel 102.

The mobile carrier 100 may also comprise a plurality of outriggers or stabilizers 113, such as may aid in stabilizing the frame 106 and/or maintaining the frame 106 at a predetermined vertical position during loading and unloading of the reel 102 and/or when the oilfield tubing 101 is being wound and unwound. For example, the stabilizers 113 may be fixedly coupled to the first and second frame portions 112, 114 at or near forward and rearward ends 130, 132 of the mobile carrier 100. The stabilizers 113 may comprise linear actuators (not shown) and/or other means operable to lift and lower the frame 106 (including when supporting the reel 102) with respect to the ground 104.

The wheels 110 are collectively operable to support the mobile carrier 100 and/or the frame 106 on the ground 104. The wheels 110 may comprise a plurality of first wheels 124 and a plurality of second wheels 126. The plurality of first wheels 124 may be operably connected to the first frame portion 112, and the plurality of second wheels 126 may be operably connected to the second frame portion 114. Thus, the opening 118 may interpose the plurality of first wheels 124 and the plurality of second wheels 126, such that the plurality of first wheels 124 is separated from the plurality of second wheels 126 by the opening 118.

The mobile carrier 100 may further comprise a suspension system (not shown) connecting the frame 106 and the pluralities of first and second wheels 124, 126 while permitting relative motion between the frame 106 and the wheels 124, 126. The suspension system may comprise various springs, shock absorbers, linkages, struts, actuators, axles, and/or other components connecting the pluralities of first and second wheels 124, 126 with the frame 106.

Each of the plurality of first wheels 124 may rotate around a corresponding one of a plurality of first shafts or axles 182, and each of the plurality of second wheels 126 may rotate around a corresponding one of a plurality of second shafts or axles 184. Each of the plurality of first axles 182 may be separate and distinct from the other first axles 182, whereby each of the first wheels 124 may rotate independently with respect to the other first wheels 124. Each of the plurality of second axles 184 may be separate and distinct from the other second axles 184, whereby each of the second wheels 126 may rotate independently with respect to the other second wheels 124. The opening 118 may interpose the plurality of first axles 182 and the plurality of second axles 184, such that each of the plurality of first axles 182 is separate and distinct from each of the plurality of second axles 184, and such that the plurality of first axles 182 is separated from the plurality of second axles 184 by the opening 118.

The mobile carrier 100 may further comprise another plurality of first and second linear actuators 178, 180 coupled between the wheels 124, 126 and the frame 106. The linear actuators 178, 180 may be operable to cooperatively move the frame 106 and, therefore, the locking portions 120, 122 in upward and downward directions 168, 170 with respect to the ground 104. The linear actuators 178, 180 may be coupled directly to the frame 106 and the axels 182, 184 of the wheels 124, 126, as shown in FIGS. 2 and 3, or the linear actuators 178, 180 may be coupled to the frame 106 and the axels 182, 184 indirectly via brackets and/or other means or devices (not shown). Accordingly, prior to connection between the first and second locking portions 120, 122 and the reel 102, the linear actuators 178, 180 may be operable to vertically adjust the frame 106 and, therefore, align the rotary actuators 138, 140 and/or the flanges 142, 144 with the reel 102 disposed on the ground 104 and/or on a support platform 176, such that the locking portions 120, 122 may engage the reel 102. Once the locking portions 120, 122 couple with the reel 102, the actuators 178, 180 may lift or vertically move the reel 102 off the ground 104 or the support platform 176, such as may permit sufficient clearance between the reel 102 and the ground 104 during transportation. Likewise, the actuators 178, 180 may lower the frame 106 and, therefore, lower the reel 102 onto the ground 104 or the support platform 176, such as may permit the reel 102 to be unloaded from the mobile carrier 100.

The linear actuators 178, 180 may be operable to translate the frame 106 relative to the wheels 110 and the ground 104 in a substantially vertical direction, such that each linear actuator 178, 180 operates at substantially the same rate, thus maintaining the frame 106 substantially parallel to the ground 104 during vertical movement. However, the linear actuators 178, 180 may also be operable to rotate the frame 106 about the forward end 130, such that the rearward end 132 moves vertically relative to the wheels 110 and the ground 104 substantially more than the forward end 130, thus tilting the frame 106 relative to the ground 104 about an axis extending laterally across the mobile carrier 100, including implementations in which the forward end 130 does not move vertically relative to the wheels 110 and the ground 104.

Additionally, the mobile carrier 100 may not include the linear actuators 172, 174, 178, 180, such that the locking mechanism 108 and/or the frame 106 may be disposed at a substantially constant and/or predetermined vertical position. To achieve connection between the reel 102 and the locking mechanism 108, in such implementations, the reel 102 may be stored at or raised toward the predetermined vertical position of the locking mechanism 108. For example, the reel 102 may be disposed on a raised platform (not shown) or another device, such that the apertures 105, 117 in the opposing connection faces 103 of the reel 102 may be at the same vertical level as the central pins 146, 148, the drive pins 150, 152, and/or the flanges 142, 144 of the locking mechanism 108. In such implementation, the reel 102 may not have to be raised by the mobile carrier 100 during loading and unloading operations.

Figure 7:
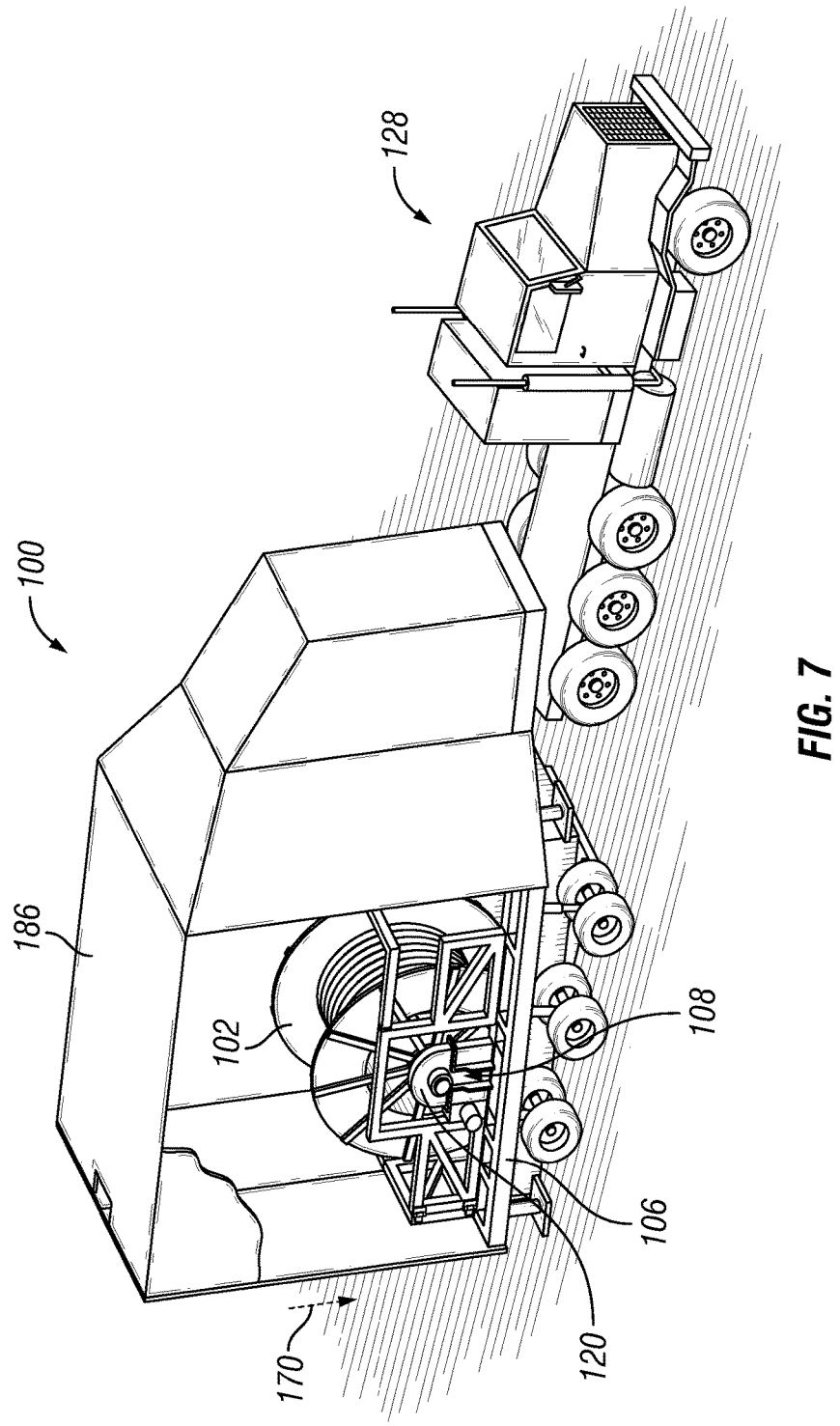
FIG. 7 is a perspective view of the apparatus shown in FIG. 1 at another stage of operation according to one or more aspects of the present disclosure.

As shown in FIG. 1, the mobile carrier 100 may comprise an enclosure 186 substantially surrounding the frame 106, the locking mechanism 108, and the reel 102 when the reel 102 is disposed within the opening 118 and/or cooperatively engaged by the locking mechanism 108 (as shown in FIG. 7). The enclosure 186 may aid in protecting the frame 106, the locking mechanism 108, and the reel 102 when the reel 102 from the environment, whether during transportation or wellsite operations. The enclosure 186 may also be thermally insulated, such as may provide additional protection from frigid, sandy, and/or other harsh ambient environments and/or conditions.

The enclosure 186 may comprise a plurality of interconnected panels connected with the frame 106, such as to maintain the enclosure 186 fixedly disposed about the frame 106, the locking mechanism 108, and the reel 102. The enclosure 186 may comprise a first side panel 188 (partially or completely removed from view in the figures for clarity), a second side panel 190, an upper panel 192, a forward panel 194 disposed proximate the forward end 130 of the mobile carrier 100, and a plurality of diagonal panels 196 extending between the side and upper panels 188, 190, 192 and the front panel 194. The diagonal panels 196 may be rounded, sloped, tapered, slanted, and/or otherwise shaped, with respect to the side and upper panels 188, 190, 192, so as to decrease drag and/or friction forces between the enclosure 186 and the atmosphere as the mobile carrier 100 is being transported along the ground 104. At least one of the side and diagonal panels 188, 190, 196 may be detachable from or movable with respect to the frame 106 and/or adjacent panels 192, 196, such as may permit easier access to the frame 106, the locking mechanism 108, and/or other internal portions of the mobile carrier 100, such as during maintenance operations.

The diagonal panels 196 may define a compartment 195 within the enclosure 186, such as may be utilized to store additional equipment associated with operations of the mobile carrier 100. For example, the compartment 195 may house a power source (not shown) operable for providing electrical, hydraulic, pneumatic, and/or other energy to the plurality of linear actuators, rotary actuators, and/or other portions of the mobile carrier 100.

The enclosure 186 may further comprise one or more rotatable or otherwise movable panels forming a door 198 at the rearward end 132 of the mobile carrier 100. The door 198 may be moveable between open and closed positions. In the open position, the door 198 may permit the mobile carrier 100 to be disposed around or about the reel 102 by moving the mobile carrier 100 in a rearward direction 136. Thus, when the door 198 is in the open position, the opening 118 extending between the first and second frame portions 112, 114 may further extend from the central frame portion 116 through the door 198 and, therefore, permit the reel 102 to be received through the door 198 into the opening 118. The enclosure 186 may further comprise an opening 200 permitting the oilfield tubing 101 to extend out of the enclosure 186 while the door 198 is closed. The opening 200 may be disposed in the upper panel 192 and/or the door 198 in a manner permitting passage of the oilfield tubing 101 as the oilfield tubing 101 is wound onto or unwound from the reel 102.

The mobile carrier 100 may be further operable for connection with the prime mover 128 operable to move the mobile carrier 100 along the ground 104. The prime mover 128 may position the mobile carrier 100 about the reel 102, such that the reel 102 is located within the opening 118 and/or between the first and second frame portions 112, 114. The prime mover 128 may also provide the driving power for moving the mobile carrier 100 between remote locations. The term prime mover, as used herein, may encompass a variety of engine and/or vehicle arrangements. The prime mover 128 may be positioned at the forward end 130 of the mobile carrier 100, opposite the rearward end 132 of the mobile carrier 100. For example, the prime mover 128 may be a truck, multi-axle automotive vehicle, or similar vehicle, such as in implementations in which the mobile carrier 100 is a trailer hitched to the truck or multi-axle automotive vehicle. Instead of being implemented as the trailer, the mobile carrier 100 may be implemented as a single truck or vehicle with no trailer, for example, comprising a single-axle prime mover 128 integrated with the mobile carrier 100.

Figure 4:
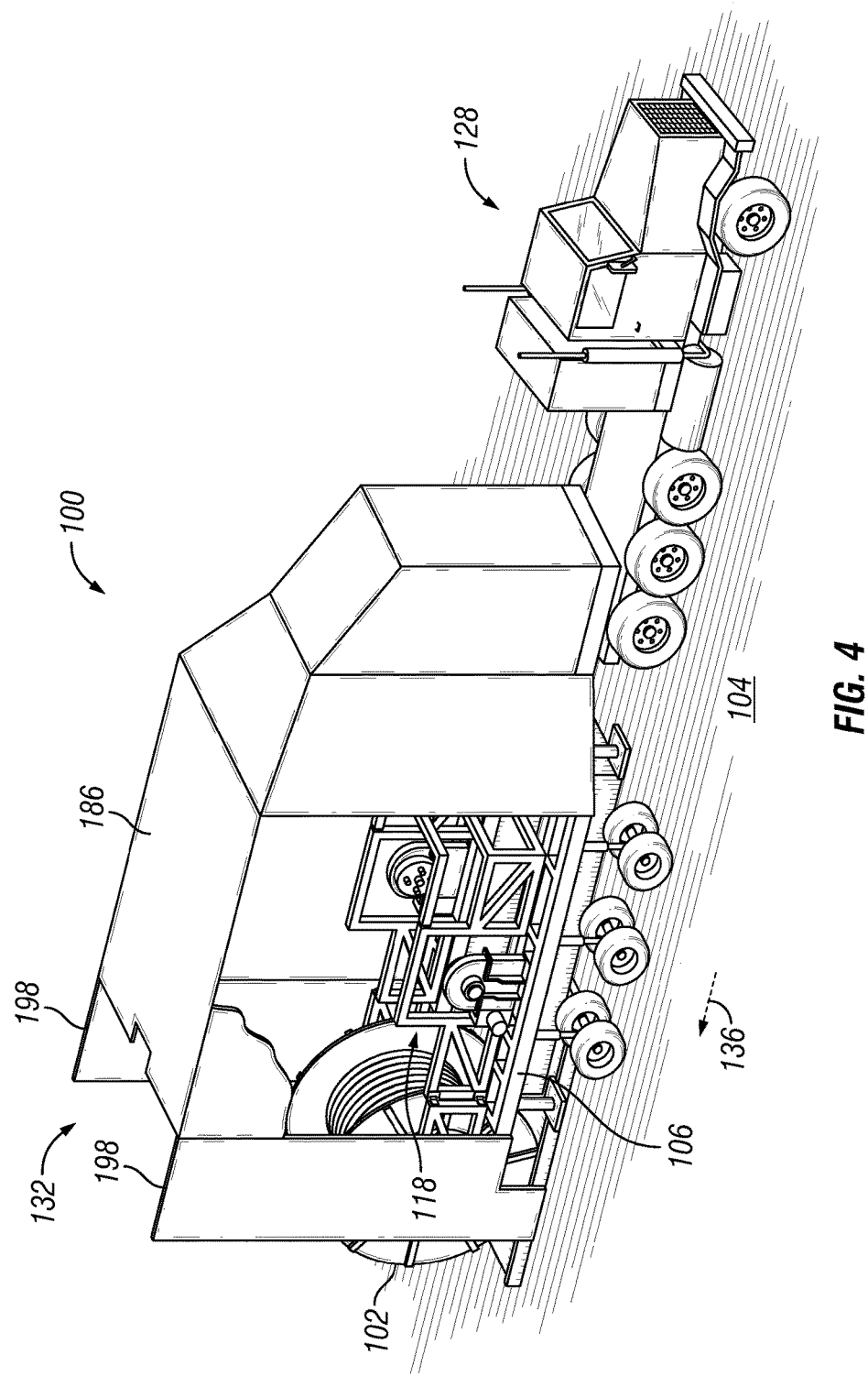
FIG. 4 is a perspective view of the apparatus shown in FIG. 1 at another stage of operation according to one or more aspects of the present disclosure.

FIGS. 4-9 are perspective views of the reel 102, the mobile carrier 100, and the prime mover 128 shown in FIG. 1 at different stages of operation according to one or more aspects of the present disclosure. Referring to FIGS. 1-9, collectively, the mobile carrier 100 may facilitate loading and transport of the reel 102 of oilfield tubing 101 without utilizing a separate and/or external lifting device to lift and/or load the reel 102 thereon. Prior to engaging the mobile carrier 100 with the reel 102, the reel 102 may be stored on the ground 104, on the platform 176 disposed on the ground 104, or at a storage facility surface (not shown). The platform 176 may be a pallet or other base able to support the reel 102 (including the oilfield tubing 101) on the ground 104. The prime mover 128 may move the mobile carrier 100 such that the rearward end 132 is aligned with or facing the reel 102, as shown in FIG. 1. With the door 198 open, the prime mover 128 may further move the mobile carrier 100 in the rearward direction 136 until the reel 102 is located within the open door 198 and is being received into the interior of the enclosure 186 within the opening 118, as shown in FIG. 4.

Figure 5:
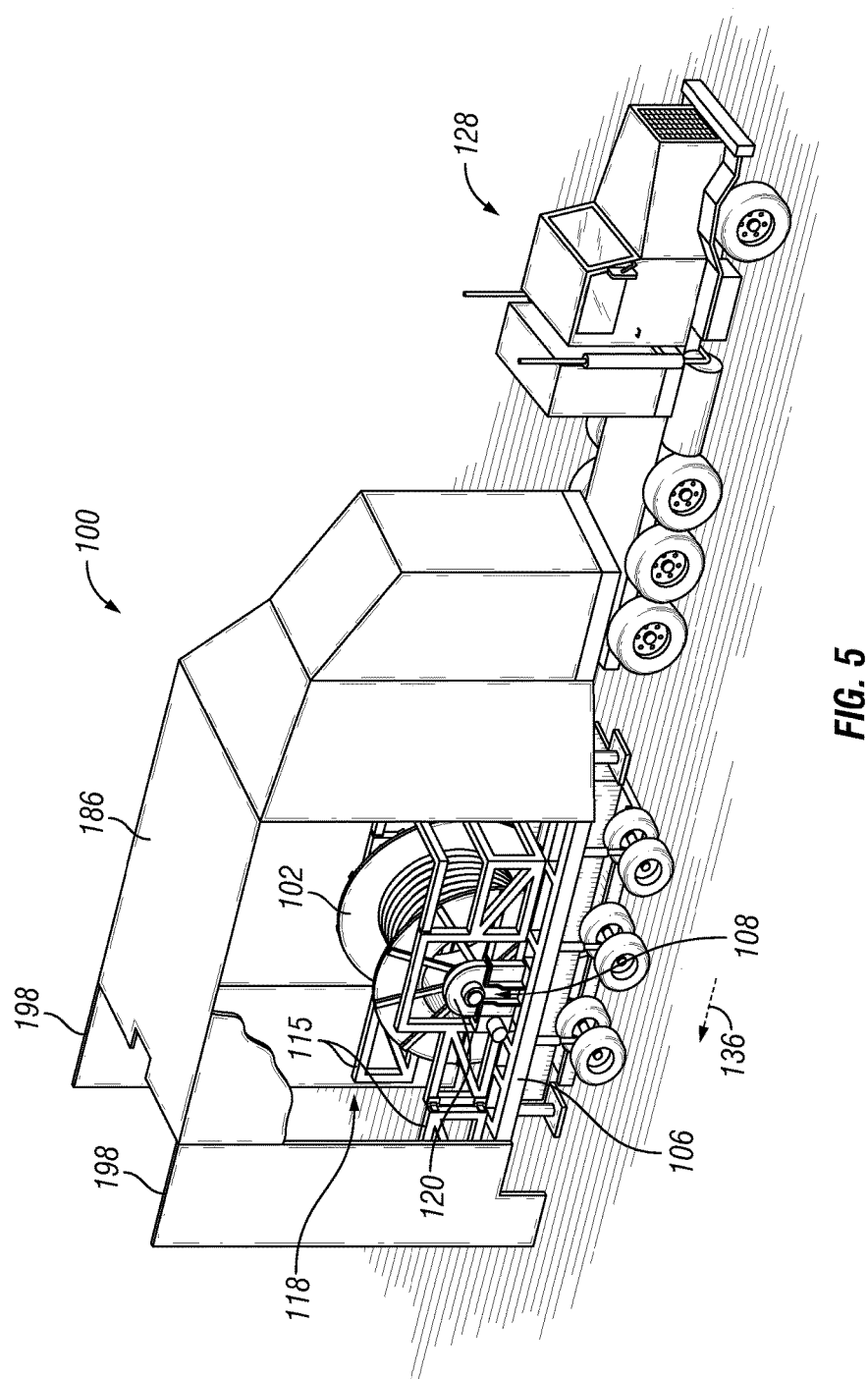
FIG. 5 is a perspective view of the apparatus shown in FIG. 1 at another stage of operation according to one or more aspects of the present disclosure.
Figure 6:
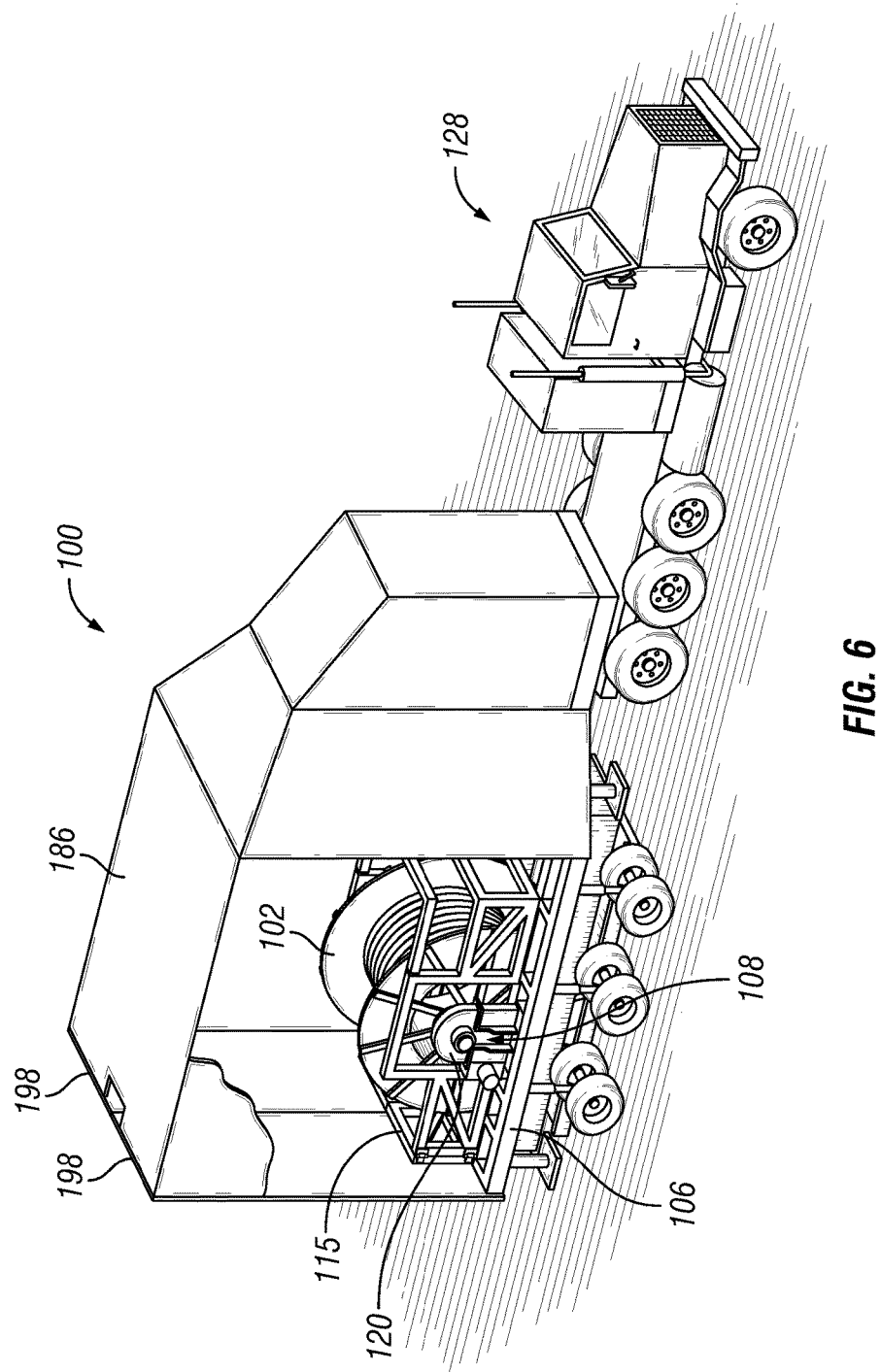
FIG. 6 is a perspective view of the apparatus shown in FIG. 1 at another stage of operation according to one or more aspects of the present disclosure.

As the prime mover 128 continues to move the mobile carrier 100 in the rearward direction 136, the reel 102 is received further into the interior of the enclosure 186 within the opening 118 until the reel 102 is disposed between the opposing first and second locking portions 120, 122 of the locking mechanism 108, as shown in FIG. 5. The gate 115 and the door 198 may then be closed, as shown in FIG. 6. Thereafter, the linear actuators 172, 174 and/or 178, 180 may be actuated to move the locking mechanism 108 and/or the frame 106 in the downward direction 170, such as to align the apertures 105, 117 and/or the connection faces 103 of the reel 102 with the central pins 146, 148, the drive pins 150, 152, and/or the flanges 142 of the first and second locking portions 120, 122, as shown in FIG. 7. Such alignment may entail tilting the frame 106 downward such that the rearward end 132 is closer to the ground 104 that the forward end 130, as shown in FIG. 7. However, in implementations in which the prime mover 128 is a multi-axle vehicle and the mobile carrier 100 is a trailer hitched to the prime mover 128, the mobile carrier 100 may be unhitched from the prime mover 128 and the prime mover 128 may be moved away from the mobile carrier 100, such that the frame 106 may be translated (instead of rotated) downward while remaining substantially parallel to the ground 104 (not shown).

Figure 8:
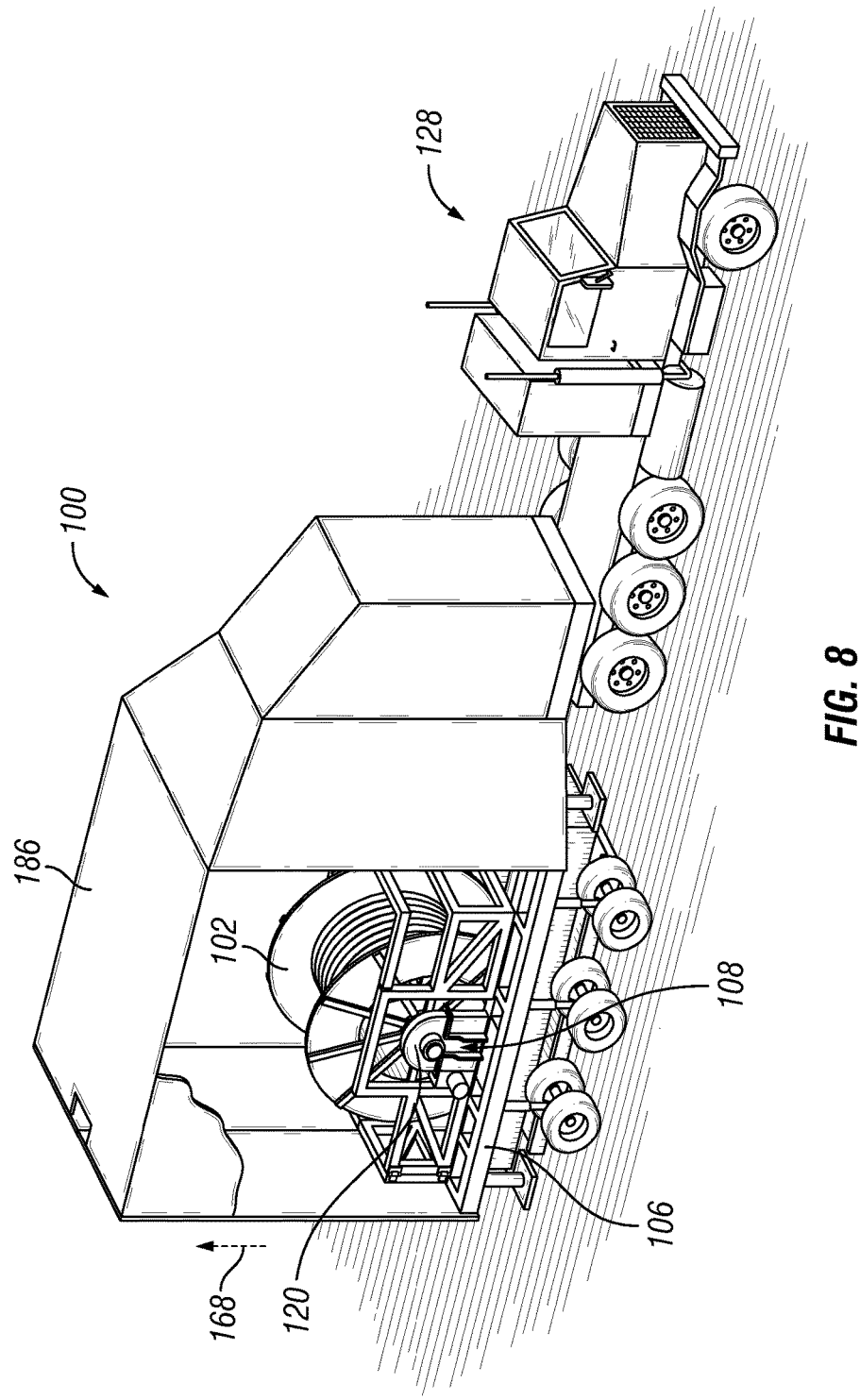
FIG. 8 is a perspective view of the apparatus shown in FIG. 1 at another stage of operation according to one or more aspects of the present disclosure.

The linear actuators 160, 162 may then be actuated to move the locking portions 120, 122 in the inward direction 154, such as to engage the central pins 146, 148, the drive pins 150, 152, and/or the flanges 142 with the apertures 105, 117 and/or the connection faces 103. After the locking mechanism 108 has engaged the reel 102, the linear actuators 172, 174 and/or 178, 180 may be actuated to move the locking mechanism 108 and/or the frame 106, along with the reel 102, in the upward direction 168, such as may permit sufficient clearance between the reel 102 and the ground 104 during transportation of the reel 102 to the wellsite, as shown in FIG. 8.

Figure 9:
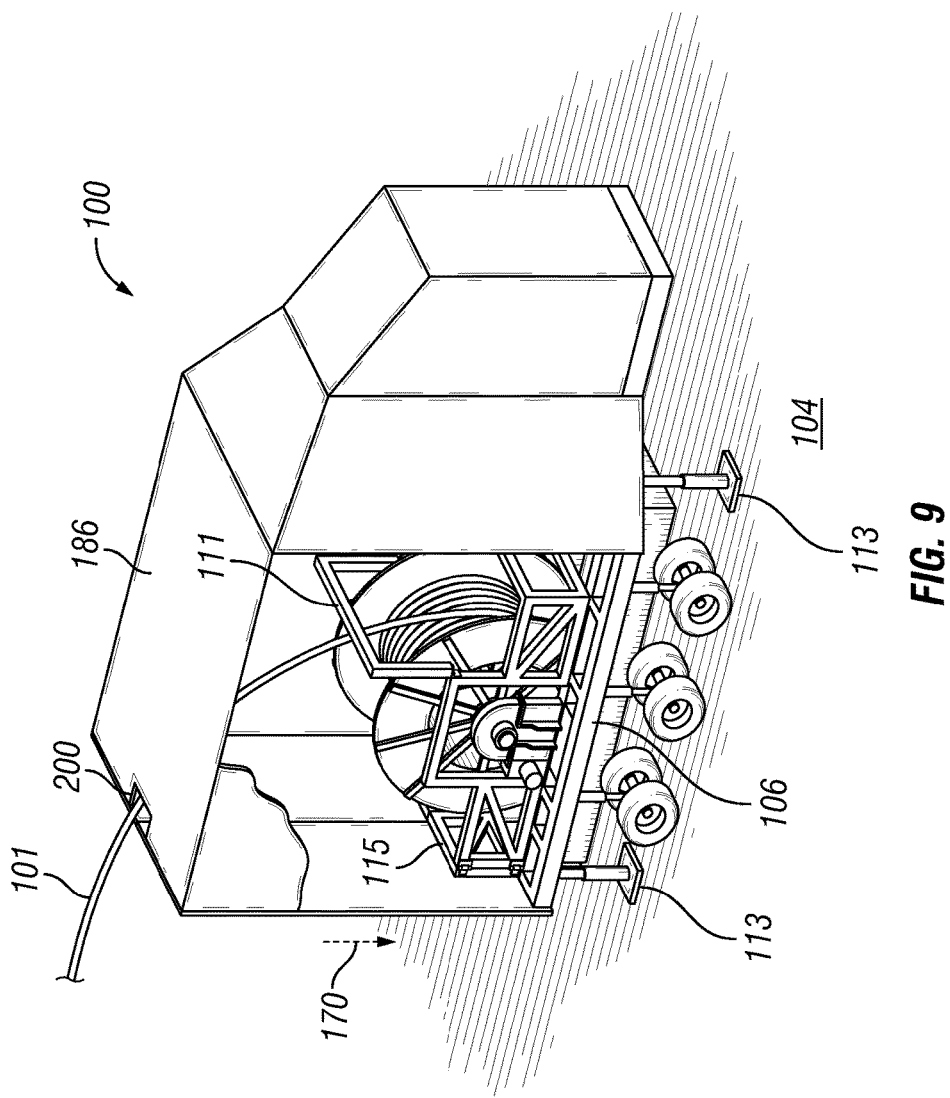
FIG. 9 is a perspective view of a portion of the apparatus shown in FIG. 1 at another stage of operation according to one or more aspects of the present disclosure.

Once the mobile carrier 100 and the prime mover 128 arrive at the wellsite, the mobile carrier 100 may be positioned in a manner permitting the oilfield tubing 101 to be pulled from the reel 102 and/or unwound by the rotary actuators 138, 140 and stabbed into an injector head (not shown) for deployment into a wellbore (not shown) at the start of downhole operations. As shown in FIG. 9, prior to such downhole operations, the prime mover 128 may be decoupled from the mobile carrier 100. However, the mobile carrier 100 and the prime mover 128 may remain coupled during operations.

The linear actuators 178, 180 may then be actuated to lower or otherwise move the frame 106 in the downward direction 170 until the stabilizers 113 are disposed on the ground 104. However, the stabilizers 113 may also be extendable into contact with the ground 104 without lowering the frame 106, as shown in FIG. 9.

Once the frame 106 and the reel 102 are stabilized on the ground 104, the levelwind assembly 111 may be actuated to the upper position shown in FIG. 9, and the rotary actuators 138, 140 of the locking mechanism 108 may be actuated to rotate the reel 102 to unwind the oilfield tubing 101. Directed by the levelwind assembly 111, the oilfield tubing 101 may be moved out of the enclosure 186 through the hole 200. Thereafter, the oilfield tubing 101 may be fed into the injector head for deployment into the wellbore.

Once the downhole operations are finished in the current wellbore, the rotary actuators 138, 140 may rotate the reel 102 to wind the oilfield tubing 101 onto the reel 102, and the mobile carrier 100 and the reel 102 of the oilfield tubing 101 may be transported back to a base or to a different wellsite. When at the base, the reel 102 may be offloaded by reversing the procedure described above.

Figure 10:
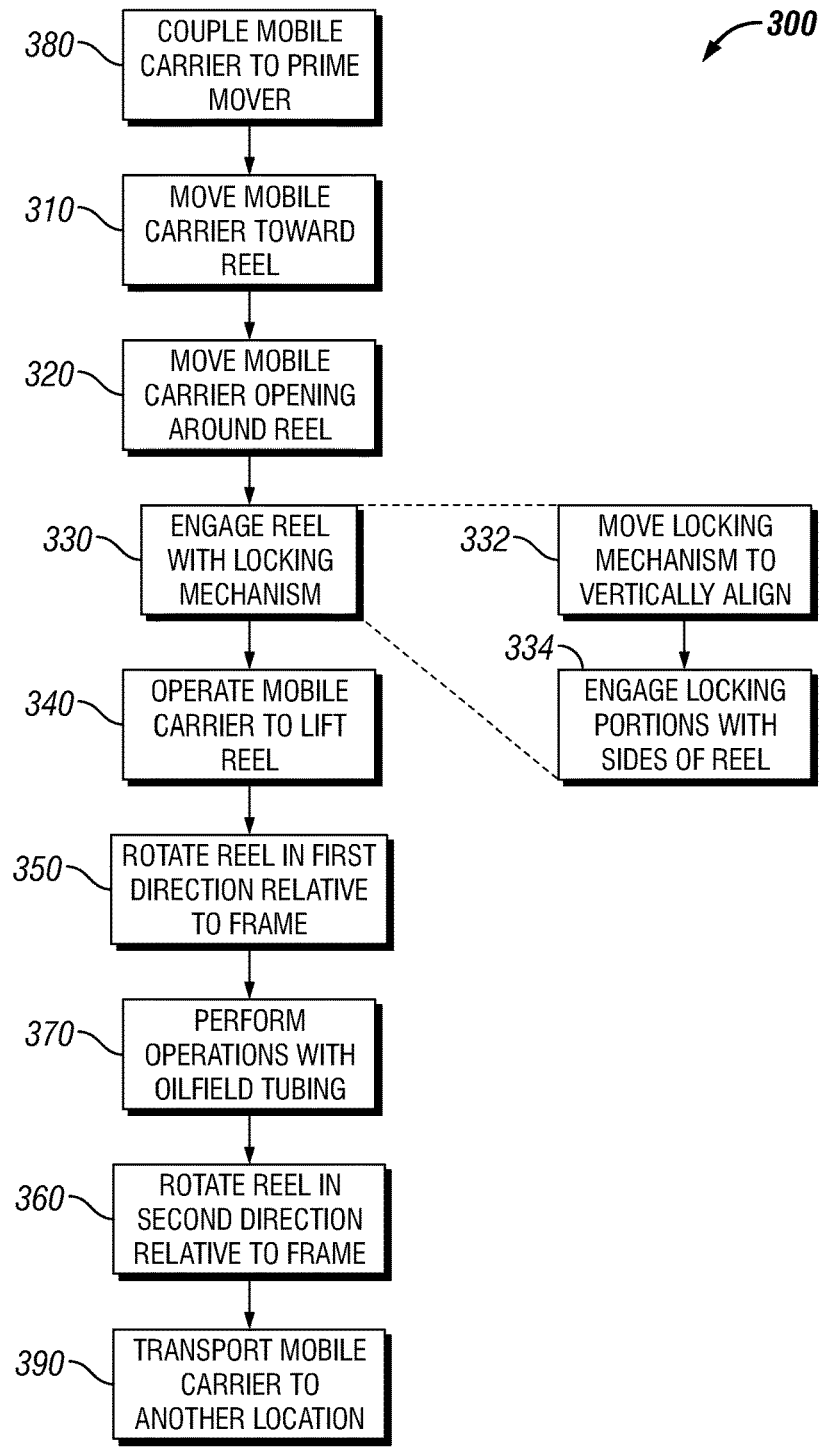
FIG. 10 is a flow-chart diagram of at least a portion of a method according to one or more aspects of the present disclosure.

FIG. 10 is a flow-chart diagram of at least a portion of a method 300 according to one or more aspects of the present disclosure. The method 300 may be performed utilizing at least a portion of one or more implementations of the apparatus shown in one or more of FIGS. 1-9 and/or otherwise within the scope of the present disclosure. Accordingly, the following description refers to FIGS. 1-10, collectively.

The method 300 comprises moving (310) the mobile carrier 100 over ground 104 toward the reel 102 containing oilfield tubing 101. The mobile carrier 100 is then moved (320) relative to the reel 102 until the reel 102 is located within the opening 118. That is, the opening 118 of the mobile carrier 100 is positioned around the reel 102, such that the reel 102 may ultimately be proximate the locking mechanism 108 and interpose the plurality of first wheels 124 and the plurality of second wheels 126. Moving (320) the mobile carrier 100 relative to the reel 102 until the reel 102 is located within the opening 118 and proximate the locking mechanism 108 may horizontally align the reel 102 with the locking mechanism 108.

The reel 102 is then engaged (330) with the locking mechanism 108. Engaging (330) the reel 102 with the locking mechanism 108 may comprise moving (332) the locking mechanism 108 vertically relative to the reel 102 to vertically align the locking mechanism 108 with the reel 102. Moving (332) the locking mechanism 108 vertically relative to the reel 102 may comprise operating one or more of the actuators 172, 174 to move the locking mechanism 108 vertically relative to the frame 106. However, moving (332) the locking mechanism 108 vertically relative to the reel 102 may also or instead comprise operating one or more of the actuators 178, 180 to move the frame 106 vertically relative to the ground 104, which may include tilting the frame 106 by lowering the rearward end 132.

Engaging (330) the reel 102 with the locking mechanism 108 may also include engaging (334) the first and second locking portions 120, 122 with corresponding first and second sides of the reel 102. Engaging (334) the first and second locking portions 120, 122 with the first and second sides of the reel 102 may comprise moving (336) the first and second locking portions 120, 122 horizontally relative to the frame 106.

After engaging (330) the reel 102 with the locking mechanism 108, the mobile carrier 100 may be operated (340) to lift the reel 102 off the ground 104 or support platform 176, thus moving the reel 102 upwards relative to the ground 104. Operating (340) the mobile carrier 100 to move the reel 102 upwards relative to the ground 104 may comprise operating the locking mechanism 108 to move the reel 102 upwards relative to the frame 106, such as by operating one or more of the actuators 172, 174. However, operating (340) the mobile carrier 100 to move the reel 102 upwards relative to the ground 104 may also or instead comprise operating one or more of the actuators 178, 180 to move the frame 106 upwards relative to the wheels 110.

The reel 102 may then be rotated (350) relative to the frame 106 after engaging (330) the reel 102 with the locking mechanism 108 and/or operating (340) the mobile carrier 100 to move the reel 102 upwards relative to the ground 104. Rotating (350) the reel 102 relative to the frame 106 may comprise operating the locking mechanism 108 to rotate the reel 102 relative to the frame 106. Rotating (350) the reel 102 relative to the frame 106 may unwind the oilfield tubing 101 from the reel 102 or wind the oilfield tubing 101 onto the reel 102. For example, rotating (350) the reel 102 relative to the frame 106 may comprise rotating the reel 102 in a first direction relative to the frame 106 to unwind the oilfield tubing 101 from the reel 102, and the method (300) may also include rotating (360) the reel 102 in a second direction (opposite the first direction) to wind the oilfield tubing 101 back onto the reel 102 after wellsite/downhole operations are performed (370).

As described above, moving (320) the mobile carrier 100 to position the opening 118 around the reel 102 may comprise operating a prime mover 128. In implementations in which the prime mover 128 is a multi-axle automotive vehicle and the mobile carrier 100 is a trailer hitched to the multi-axle automotive vehicle, the method (300) may also comprise coupling (380) the mobile carrier trailer to the multi-axle automotive vehicle. After wellsite operations are performed (370) utilizing the oilfield tubing 101, and the oilfield tubing 101 is wound (360) back onto the reel 102, the mobile carrier (including the reel 102 and the oilfield tubing 101 wound thereon) may be transported (390) to another location, such as another wellsite or an operations base, such as by operating the prime mover 128 to travel over one or more public roadways.

In view of the entirety of the present disclosure, including the figures and the claims, a person having ordinary skill in the art will readily recognize that the present disclosure introduces an apparatus comprising: a mobile carrier operable for transporting a reel of oilfield tubing across ground, wherein the mobile carrier comprises: a frame comprising a first frame portion, a second frame portion, and a central frame portion extending between the first and second frame portions, wherein the first, second, and central frame portions define an opening for receiving the reel; a locking mechanism operable to engage and rotate the reel within the opening; and a plurality of wheels supporting the frame on the ground, wherein the plurality of wheels comprises a plurality of first wheels operably connected to the first frame portion and a plurality of second wheels operably connected to the second frame portion, and wherein the opening interposes the plurality of first wheels and the plurality of second wheels.

The oilfield tubing may comprise coiled tubing.

The mobile carrier may be moveable along the ground to position the mobile carrier about the reel such that the reel is located between the first and second frame portions.

The first and second frame portions may each extend substantially longitudinally relative to the mobile carrier, and the central frame portion may extend substantially laterally relative to the mobile carrier.

The locking mechanism may comprise a first locking portion and a second locking portion. In such implementations, the first locking portion may be connected to the first frame portion, and the second locking portion may be connected to the second frame portion. The first and second locking portions may be cooperatively operable to engage and rotate the reel within the opening. The first and second locking portions may be operable to cooperatively move the reel vertically relative to the ground. At least one of the first and second locking portions may be rotatable to rotate the reel with respect to the frame. At least one of the first and second locking portions may move horizontally relative to the frame. At least one of the first and second locking portions may move vertically relative to the ground.

Each of the plurality of first wheels may independently rotate around a corresponding one of a plurality of first axles, and each of the plurality of second wheels may rotate independently around a corresponding one of a plurality of second axles. Each of the plurality of first axles may be separate and distinct from each of the plurality of second axles. The opening may interpose the plurality of first axles and the plurality of second axles.

The mobile carrier may further comprise an enclosure substantially surrounding the frame, the locking mechanism, and the reel when the reel is cooperatively engaged by the locking mechanism. The enclosure may comprise a door moveable between open and closed positions, and the opening between the first and second frame portions may extend horizontally from the central frame portion through the door when the door is in the open position.

The mobile carrier may further comprise a plurality of actuators collectively operable to move the frame vertically relative to the ground and the plurality of wheels.

The mobile carrier may be operable for connection with a prime mover. The apparatus may further comprise a prime mover operable to move the mobile carrier along the ground to position the mobile carrier about the reel such that the reel is located between the first and second frame portions. The prime mover may be or comprise a multi-axle automotive vehicle, and the mobile carrier may be or comprise a trailer hitched to the multi-axle automotive vehicle.

The present disclosure also introduces a method comprising: moving a mobile carrier over ground toward a reel containing oilfield tubing, wherein the mobile carrier comprises: a frame defining an opening for receiving the reel; a locking mechanism connected to the frame and operable to engage and rotate the reel within the opening; and a plurality of wheels connected to and supporting the frame on the ground, wherein the plurality of wheels comprises a plurality of first wheels and a plurality of second wheels, and wherein the opening interposes the plurality of first wheels and the plurality of second wheels; moving the mobile carrier relative to the reel until the reel is located within the opening and proximate the locking mechanism such that the reel interposes the plurality of first wheels and the plurality of second wheels; and engaging the reel with the locking mechanism.

Moving the mobile carrier toward the reel, and moving the mobile carrier relative to the reel until the reel is located within the opening, may each comprise operating a prime mover. The prime mover may be or comprise a multi-axle automotive vehicle, and the mobile carrier may be or comprise a trailer hitched to the multi-axle automotive vehicle. The method may further comprise coupling the mobile carrier trailer to the multi-axle automotive vehicle.

Moving the mobile carrier relative to the reel until the reel is located within the opening and proximate the locking mechanism may horizontally align the reel with the locking mechanism. Engaging the reel with the locking mechanism may comprise moving the locking mechanism vertically relative to the reel to vertically align the locking mechanism with the reel. Moving the locking mechanism vertically relative to the reel may comprise operating an actuator to move the locking mechanism vertically relative to the frame. Moving the locking mechanism vertically relative to the reel may comprise operating an actuator to move the frame vertically relative to the ground.

The locking mechanism may comprise a first locking portion and a second locking portion on opposing sides of the opening, and engaging the reel with the locking mechanism may comprise engaging the first locking portion with a first side of the reel and engaging the second locking portion with a second side of the reel. Engaging the first locking portion with the first side of the reel may comprise moving the first locking portion horizontally relative to the frame, and engaging the second locking portion with the second side of the reel may comprise moving the second locking portion horizontally relative to the frame.

The method may further comprise operating the mobile carrier to move the reel upwards relative to the ground. Operating the mobile carrier to move the reel upwards relative to the ground may comprise operating the locking mechanism to move the reel upwards relative to the frame. Operating the mobile carrier to move the reel upwards relative to the ground may comprise operating a plurality of actuators to move the frame upwards relative to the plurality of wheels.

The method may further comprise rotating the reel relative to the frame after engaging the reel with the locking mechanism. Rotating the reel relative to the frame may comprise operating the locking mechanism to rotate the reel relative to the frame. Rotating the reel relative to the frame may unwind the oilfield tubing from the reel. Rotating the reel relative to the frame may comprise rotating the reel in a first direction relative to the frame, and the method may further comprise rotating the reel in a second direction relative to the frame, wherein the second direction is opposite the first direction, and wherein rotating the reel in the second direction may wind the oilfield tubing onto the reel.

The method may further comprise moving the mobile carrier, and thus the engaged reel, from a current location to another location.

The present disclosure also introduces an apparatus comprising: a frame defining an opening for receiving a reel of oilfield tubing; a locking mechanism operable to engage and rotate the reel within the opening; and a plurality of wheels supporting the frame on the ground, wherein the plurality of wheels comprises a plurality of first wheels operably connected to the frame and a plurality of second wheels operably connected to the frame, and wherein the opening interposes the plurality of first wheels and the plurality of second wheels.

The apparatus may be operable for connection with a prime mover.

The oilfield tubing may comprise coiled tubing.

The frame may comprise a first frame portion and a second frame portion, and the apparatus may be moveable along the ground to position the apparatus about the reel such that the reel is located between the first and second frame portions.

The frame may comprise a first frame portion, a second frame portion, and a central frame portion extending between the first and second frame portions, wherein the first and second frame portions may each extend substantially longitudinally relative to the apparatus, and wherein the central frame portion may extend substantially laterally relative to the apparatus.

The locking mechanism may comprise a first locking portion and a second locking portion, and the first and second locking portions may be operable to cooperatively move the reel vertically relative to the ground.

The locking mechanism may comprise a first locking portion and a second locking portion, and at least one of the first and second locking portions may be rotatable to rotate the reel with respect to the frame.

The locking mechanism may comprise a first locking portion and a second locking portion. In such implementations, at least one of the first and second locking portions may move horizontally and/or vertically relative to the frame and/or the ground.

Each of the plurality of first wheels may independently rotate around a corresponding one of a plurality of first axles, and each of the plurality of second wheels may rotate independently around a corresponding one of a plurality of second axles. Each of the plurality of first axles may be separate and distinct from each of the plurality of second axles. The opening may interpose the plurality of first axles and the plurality of second axles.

The apparatus may further comprise an enclosure substantially surrounding the frame, the locking mechanism, and the reel when the reel is cooperatively engaged by the locking mechanism. The frame may comprise a first frame portion, a second frame portion, and a central frame portion extending between the first and second frame portions, and the enclosure may comprise a door moveable between open and closed positions. In such implementations, the opening between the first and second frame portions may extend horizontally from the central frame portion through the door when the door is in the open position.

The apparatus may further comprise a plurality of actuators collectively operable to move the frame vertically relative to the ground and the plurality of wheels.

The frame may comprise a first frame portion and a second frame portion, and the apparatus may further comprise a prime mover operable to move the frame along the ground to position the frame about the reel such that the reel is located between the first and second frame portions. The prime mover may be or comprise a multi-axle automotive vehicle, and the frame, locking mechanism, and the plurality of wheels may form at least a portion of a trailer hitched to the multi-axle automotive vehicle.

The foregoing outlines features of several implementations so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the implementations introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method, comprising:
   providing a mobile carrier that comprises: a frame defining an opening for receiving the reel; a locking mechanism connected to the frame and operable to engage and rotate the reel within the opening; and a plurality of wheels connected to and supporting the frame on the ground, wherein the plurality of wheels comprises a plurality of first wheels and a plurality of second wheels, and wherein the opening interposes the plurality of first wheels and the plurality of second wheels;
   moving the mobile carrier over ground toward a reel containing oilfield tubing until the reel is positioned adjacent the opening defined by the frame;
   lowering the frame vertically such that the frame is maintained parallel to the ground;
   engaging the reel with the locking mechanism; and
   raising the frame and the reel vertically such that the reel may be transported.

2. The method of claim 1 wherein moving the mobile carrier toward the reel, and moving the mobile carrier relative to the reel until the reel is located within the opening, each comprise operating a prime mover.

3. The method of claim 1 wherein moving the mobile carrier relative to the reel until the reel is located within the opening and proximate the locking mechanism horizontally aligns the reel with the locking mechanism, and wherein engaging the reel with the locking mechanism comprises moving the locking mechanism vertically relative to the reel to vertically align the locking mechanism with the reel.

4. The method of claim 1 further comprising operating the mobile carrier to move the reel upwards relative to the ground.

5. The method of claim 4 wherein operating the mobile carrier to move the reel upwards relative to the ground comprises at least one of: operating the locking mechanism to move the reel upwards relative to the frame; and operating a plurality of actuators to move the frame upwards relative to the plurality of wheels.

6. The method of claim 1 further comprising, after engaging the reel with the locking mechanism, operating the locking mechanism to rotate the reel relative to the frame.

* * * * *